United States Patent Office 3,393,242
Patented July 16, 1968

3,393,242
PROCESS FOR PRODUCING DIETHERS AND PRODUCTS RESULTING FROM SAID PROCESS
Virgil L. Seale and Robert E. Law, Houston, Tex., assignors to Nalco Chemical Company, Chicago, Ill., a corporation of Delaware
No Drawing. Filed Sept. 10, 1964, Ser. No. 395,597
8 Claims. (Cl. 260—611)

ABSTRACT OF THE DISCLOSURE

Water immiscible diethers of polyoxyalkylene glycols which have been prepared by reacting an alcoholate of a polyoxyalkylene glycol monoether with an organic halide to form a water immiscible diether containing some excess organic halide are purified by adding to the resultant product a water soluble amine capable of reacting with the excess organic halide to form a salt, and thereafter removing said salt and any excess of said water soluble amine from the resultant water immiscible diether. The said water soluble amine should be non-emulsifying per se and when reacted with said organic halide.

This invention relates to a process for producing diethers and the products therefrom, and more particularly to a process for producing water immiscible benzyl ethers of a polyoxyalkylene glycol monoether and to new products obtained by said process.

One of the objects of the present invention is to provide a new and improved process for making diethers of polyoxyalkylene glycols.

A more specific object of the invention is to provide a new and improved process for making water immiscible benzyl ethers of polyoxyalkylene glycol monoethers.

Another object of the invention is to provide a process of the type described in which undesirable impurities are removed from the resultant products.

Still a further object of the invention is to provide a process of the type described which avoids side reactions that give rise to hydroxyl formation.

Another object of the invention is to provide a process of the type described which will produce products that are capable of being used as solvents for Grignard reagents and are free from impurities which would ordinarily react with Grignard reagents.

Still a further object of the invention is to provide new and improved products which are especially useful as solvents and are particularly useful as solvents for Grignard reagents. Other objects will appear hereinafter.

It is well known in chemical reactions that an alcohol can be reacted with sodium so that the terminal hydroxyl group is converted to an —ONa group and that the sodium alcoholate can be then reacted further with organic halides, such as chlorides, bromides and iodides to make ethers. In the manufacture of such products, however, problems arise when attempts are made to remove unreacted halides. It is especially important to solve these problems where the impurities in the resultant product are likely to interfere with the subsequent use of the product. Thus, if the product is to be used as a solvent for a Grignard reagent and the latter reacts with hydroxyl groups or other groups containing reactive hydrogen atoms, it is quite important that the products be free from such groups or atoms.

In accordance with the present invention diethers of polyoxylalkylene glycols are prepared which are substantially free from impurities that tend to cause side reactions when such ethers are used as solvents, and more particularly as solvents for Grignard reagents. These diethers are prepared by a new and improved process which involves reacting a polyoxyalkylene glycol monoether containing a primary hydroxyl group with sodium to form a sodium alcoholate of the monoether, thereafter reacting said alcoholate with an organic halide to form a diether in which one of the ether groups corresponds to the organic group of the orangic halide, adding an amine capable of reacting with any excess organic halide to form a salt and thereafter removing said salt from the resultant product.

In the preferred process contemplated by the invention a benzyl ether of a polyoxyalkylene glycol monoether is produced by reacting a benzyl halide with a salt of a polyoxyalkylene glycol monoether to form a water immiscible benzyl ether of a polyoxyalkylene glycol monoether, thereafter a water soluble tertiary amine capable of reacting with any free benzyl halide present is added to the resultant product so that any free benzyl halide present is converted to a quaternary benzyl salt. The quaternary benzyl salt is soluble in water and is preferably removed by water washing the product. Any excess tertiary amine is also soluble in water and would be simultaneously removed from the resultant product. If a volatile tertiary amine is used, such as trimethylamine, the excess tertiary amine can also be removed by gas purging.

It is important for the purpose of the invention that the monoether of the polyoxyalkylene glycol contain a primary hydroxyl group from which the sodium alcoholate is formed. So long as the polyoxyalkylene glycol is made from ethylene oxide no problem arises. However, if it is desired to use a polyoxyalkylene glycol made from propylene oxide alone, there would be few primary hydroxyl groups. Accordingly, such glycols are further reacted with ethylene oxide to provide primary hydroxyl groups which are necessary to the formation of a sodium alcoholate that will give a low hydroxyl residual. The objective is to react the alcoholic hydroxyl to the point of extinction and to avoid side reactions which can give rise to hydroxyl formation.

The monoethers of polyoxyalkylene glycols containing a primary hydroxyl group are well known and many such ethers are described in U.S. 1,633,927, as well as elsewhere in the literature. Thus, the monoethylether of diethylene glycol is prepared by reacting one mole of ethyl alcohol with two moles of ethylene oxide. The monoethylether of triethylene glycol is prepared by reacting one mole of ethyl alcohol with three moles of ethylene oxide. Other monoethers of polyoxyalkylene glycols are similarly prepared by reacting an alcohol with ethylene oxide. It is also possible to react the alcohol first with 1,2-propylene oxide followed by the addition of ethylene oxide or with 1,2-butylene oxide followed by the addition of ethylene oxide.

The reaction with sodium requires anhydrous conditions. This reaction is normally carried out by charging the monoether of the polyoxyalkylene glycol into a closed reactor or autoclave and heating the contents to a temperature of at least 95° C., while purging with nitrogen. The sodium is then added while maintaining an atmosphere of nitrogen or other inert atmosphere free from oxygen. The reaction is carried out preferably at a temperature of 95° C. to 120° C. until the alcoholate of the monoether of the polyoxyalkylene glycol has formed.

The desired organic halide, such as benzyl chloride, is then added to the reaction vessel, preferably at a temperature below 140° C. and the temperature of the reaction mixture is raised or is allowed to rise to 150° C. to 170° C. Higher temperatures up to say 200° C. can be used but are not ordinarily necessary. The inert atmosphere is maintained during the addition of the organic halide but is no longer necessary after the organic halide addition has been completed.

The addition of the organic halide converts the monoether of the polyoxyalkylene glycol to a diether but normally some unreacted organic halide will be present and it is necessary to remove this, together with the sodium salt formed, without destroying the diether or introducing other undesirable impurities. Such removal is accomplished in accordance with the present invention by adding a water soluble amine, preferably one which will form a quaternary salt with the unreacted organic halide.

Examples of suitable amines are those having the formula:

where $R_1$ and $R_2$ are from the group consisting of methyl and ethyl and $R_3$ is an alkyl radical containing a sufficient number of carbon atoms to render said amine water soluble, e.g., trimethylamine, dimethylethylamine, monomethyldiethylamine, triethylamine, methylethylisopropylamine, methylethylpropylamine, dimethylisopropylamine, methylethylpropylamine, dimethylpropylamine, diethylisopropylamine, diethylpropylamine, dimethylbutylamine, and the like.

Other suitable amines which are water soluble and form quaternary salts with benzyl halides are tetraalkyl substituted polyamines such as, for example, ethylenediamine, diethylenetriamine and triethylenetetramine, or mixtures of one or more of such amines in which the aminohydrogen atoms are substituted with methyl and/or ethyl groups.

In general, the amine molecule should be sufficiently low in molecular weight so that excess amine can be removed by water washing or by a gas purge. The amine should also be one which is non-emulsifying either by itself or when reacted with the benzyl halide. If the molecular weight of the amine were too large or the amine contained hydrocarbon chains longer than six carbons the resultant quaternary ammonium compounds would have sufficient surface active properties to cause considerable difficulty in the process by acting as an emulsifier for the desired product ether with any aqueous material with which it might be washed. Finally, the amine must be capable of reacting with the benzyl halide (i.e. benzyl chloride, bromide or iodide) to form a salt. Symmetrical tertiary alkyl amines higher than triethylamine are very difficult to react with benzyl chloride. This is likely due to steric hinderance around the nitrogen atom.

Water soluble, non-emulsifying amines such as methylamine, dimethylamine, ethylamine, diethylamine, and other primary and secondary amines, while capable of being used in the process, are less desirable because of the complications they might cause if traces of them were allowed to remain in the product ether and the latter were used as a solvent for compounds that react with aminohydrogen atoms. It is therefore desirable to react the excess benzyl halide with an amine containing no reactive hydrogen atoms attached to the amino group or groups, thereby forming a quaternary salt of the benzyl halide rather than a secondary or tertiary amine salt.

After the addition of the water soluble amine and its reaction with the unreacted organic halide, it is desirable to remove the salt of the organic halide and any unreacted amine. In the case where the desired product is a water immiscible diether this is readily accomplished by washing with water. The salts of the amine and the organic halide as well as inorganic sodium salts and the unreacted amine are soluble in water and are therefore readily removed by water washing. If desired, several water rinses can be used. In each rinse the product mixture is mixed with the water and the water insoluble phase is separated from the water soluble phase in any suitable manner. The water insoluble phase is the desired product. Amine salts of the organic halide can be recovered from the water soluble phase in any suitable manner. If the amine is a volatile amine, such as trimethylamine, any unreacted amine can readily be removed by purging with an inert gas, such as nitrogen.

The temperature during the addition of the amine and thereafter during its reaction with the excess organic halide is subject to variation but good results are normally obtained at temperatures within the range of 80° C. to 100° C. The same or different temperatures can be used in the water washing step.

In order to obtain a good separation of the product phase and the aqueous phase after washing, it may be desirable to add during, prior to or after the water washing step a hydrocarbon which has a boiling point sufficiently different from the product ether that it can be removed by distillation. Sometimes where the product ether is intended to be used as a solvent, such removal is unnecessary. Examples of suitable hydrocarbons are benzene and toluene but the invention is not limited to these examples.

After the washing with water, the reactor temperature is slowly raised and the product is dehydrated. Heating is continued until the product is free of water. If a hydrocarbon, such as toluene, has been added, the water begins to come off at approximately 95° C. but this will vary depending upon the amount of toluene present. After all of the water has been removed and where it is desirable to remove the aromatic hydrocarbon (toluene etc.), the pressure is reduced below atmospheric pressure during such removal. The product is then cooled and is ready for use.

Certain products which have been produced in accordance with the process are believed to be new and are particularly valuable for use as solvents, especially as solvents for Grignard reagents, such as, for example, methyl magnesium chloride, ethyl magnesium chloride, and homologues thereof. The invention is especially useful in preparing water immiscible benzyl ethers of polyoxyalkylene glycol monoethers having the following general formula

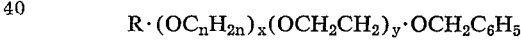

where R is a hydrocarbon group (preferably containing 1 to 6 carbon atoms), $n$ is 2 to 3, $x$ is 2 to 4, $y$ is 0 when $n$ is 2 and at least 1 when $n$ is 3 with the further proviso that the values of R, $n$, $x$ and $y$ are such that the resultant compound is soluble in water to the extent of not more than 1.0% by weight at 20° C.

The invention will be further illustrated but is not limited by the following example in which the quantities are stated in parts by weight unless otherwise indicated.

Example 7750 parts of the ethylether of triethylene glycol were charged into a vented reactor and heated to 95° C. while purging with nitrogen.

1175 parts of metallic sodium in the form of bricks were added, 10–15 parts at a time, at a temperature within the range of 95° C. to 115° C. while cooling the reactor as necessary in order to maintain this temperature range.

The sodium addition was also conducted under a nitrogen atmosphere, but with the reactor vent open, and upon the completion of the sodium addition, while maintaining a positive nitrogen atmosphere on the reactor contents, the reaction with the sodium was allowed to proceed at a temperature of 115° C. to 120° C. for eight hours. The reactor vent was partially closed during this period to aid in maintaining the inert atmosphere on the vessel contents.

6350 parts of benzyl chloride was gradually added to the reactor while maintaining the inert atmosphere within the vessel during this addition. The first half of the benzyl chloride was added at a temperature below 140° C. and the last half at a temperature of 150° C. to 170° C. The reactor temperature was at least 160° C. during the addition of the final 1000 parts of benzyl chloride. Upon completion of the benzyl chloride addition the reactor contents was heated at 150°–160° C. for six hours. At this point it was no longer necessary to maintain the inert atmosphere.

After the last mentioned six hour heating period, the reactor contents was cooled to 90° to 100° C. and 6000 parts of water was added with agitation. While continuing to maintain a temperature of 90° to 100° C. the agitation was discontinued and the reactor contents was allowed to stand undisturbed for approximately 15 minutes. This caused the separation of two phases, namely, an aqueous phase and a water immiscible phase. The aqueous phase was then drawn off and the water immiscible or product phase was recovered.

If it it found by analysis that all of the crystalline salts formed during the reaction have not been removed by the first water rinse, a second water rinse at 90° to 100° C. may be required. At this point substantially all of the inorganic salts, such as sodium chloride, have been removed but the product phase still contains some unreacted organic halide. To remove this, a 50% excess of 25% trimethylamine dissolved in water based on determined organic halide content was added to the reactor containing the water immiscible phase that had previously been washed with water. The reactor contents containing the trimethylamine were then heated to 80° C. to 90° C. and held at this temperature for six hours. The product was then washed with 5000 parts of water at approximately 90° C. 1500 parts of toluene were added in order to facilitate separation of the product and aqueous phases. Similar water washing was repeated until all unreacted amine and the salt formed by the reaction of the amine and the excess organic halide were removed. 3 water washes were required.

The aqueous phase was then separated from the water immiscible phase and the water immiscible phase was heated until the product was dehydrated. Some amounts of water present in the water immiscible phase began to come off at approximately 95° C. Heating was continued for 6 hours until the product was free of water. At this point the water immiscible phase was subjected to a vacuum (50–75 mm. of mercury) while the heating was continued at a point sufficiently high to vaporize the toluene which was removed from the product. The residual product after removal of the toluene consisted essentially of the benzylether of the monoethylether of triethylene glycol and had a boiling point within the range of 320° C. to 340° C. This product dissolves in water to the extent of less than 0.5% at 20° C. and is therefore water immiscible.

In a similar manner the monoethylether of diethylene glycol can be substituted for the monoethylether of triethylene glycol to produce a water immiscible benzyl ether of the monoethylether of diethylene glycol. Likewise, in the example, the monoethylether of tetraethylene glycol can be substituted for the monoethylether of triethylene glycol to produce the benzyl ether of the monoethylether of tetraethylene glycol. Similarly, the monoether used as a starting material can consist of the product of the reaction of an organic hydroxyl compound with one or more moles per mole of such compound of 1,2-propylene oxide followed by the addition of one or more moles of ethylene oxide.

The term "water immiscible" as used herein is intended to cover compounds that are soluble in water to the extent of not more than 1% by weight at a temperature of 20° C.

The invention provides new and useful water immiscible benzylethers of polyoxyalkylene glycol monoethers and also provides a new and improved process for purifying diethers of polyoxyalkylene glycols which are water immiscible.

Throughout the specification and claims the expression "excess organic halide" refers to unreacted or free organic halide.

Similarly, the expression "excess water soluble amine" refers to unreacted or free water soluble amine.

The quantity of organic halide which is reacted with the alcoholate of the polyoxyalkylene glycol monoether is normally at least the theoretical amount required to convert said monoether to a diether and the excess usually does not exceed 0.1 mole per mole of said diether.

The quantity of the water soluble amine is at least the amount theoretically required to react with the excess organic halide and the excess of water soluble amine usually does not exceed 0.5 mole per mole of excess organic halide.

The invention is hereby claimed as follows:

1. In a process for producing a water immiscible diether of a polyoxyalkylene glycol containing 2 to 4 carbon atoms in the alkylene groups wherein a benzyl halide capable of forming a salt with a water soluble amine is reacted with an alcoholate of a polyoxyalkylene glycol monoether containing 2 to 4 carbon atoms in the alkylene groups to form a water immiscible diether containing the benzyl radical of said benzyl halide as one of the ether groups, and also having some excess benzyl halide present therein, the steps which comprise adding to the resultant product a water soluble amine and heating the resulting mixture, the said amine thus reacting with the excess benzyl halide to form a salt thereafter removing said salt and any excess of said water soluble amine from the resultant water immiscible diether, said amine being non-emulsifying by itself and when reacted with said benzyl halide.

2. A process as defined in claim 1 in which said salt of said amine and said benzyl halide are removed by washing the resultant product with water.

3. A process as defined in claim 1 in which a hydrocarbon is added in order to facilitate separation of an aqueous phase containing said salt of said water soluble amine and said benzyl halide and a water immiscible phase containing said diether.

4. In a process for producing a water immisible benzylether of a polyoxyalkylene glycol monoether containing 2 to 4 carbon atoms in the alkylene groups wherein benzyl chloride is reacted with the sodium alcoholate of a polyoxyalkylene glycol monoether containing 2 to 4 carbon atoms in the alkylene groups to form a water immiscible benzyl ether of a polyoxyalkylene glycol monoether, the steps which comprise adding to the resultant product a water soluble tertiary amine and heating the resulting mixture, the said amine thus reacting with any free benzyl chloride present to form a quaternary benzyl salt, said amine being non-emulsifying by itself and when reacted with said benzyl chloride, and removing said quaternary salt and any excess tertiary amine from said water immiscible benzyl ether.

5. A process as defined in claim 4 in which said quaternary salt and excess tertiary amine are removed from said water immiscible benzyl ether by washing with water.

6. A process as defined in claim 4 in which toluene is also added to the resultant product in an amount sufficient to enhance the separation of a water immiscible phase containing said benzyl ether and an aqueous phase containing said quaternary salt and any excess water soluble tertiary amine.

7. A process for producing a benzylether of a polyoxyalkylene glycol monoether substantially free from hydroxyl groups which comprises reacting metallic sodium under anhydrous conditions with a compound having the formula

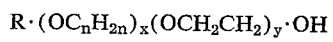

where R is a hydrocarbon group containing 1 to 6 carbon atoms, $n$ is 2 to 3, $x$ is 2 to 4, $y$ is 0 when $n$ is 2 and at least 1 when $n$ is 3 with the further proviso that the values of R, $n$, $x$ and $y$ are such that when the resultant sodium alcoholate is reacted with a benzyl halide a water immiscible benzyl ether of a polyoxyalkylene glycol monoether is formed, reacting said sodium alcoholate with a benzyl halide to form said water immiscible benzyl ether of a polyoxyalkylene monoether, thereafter adding to the resultant product a water soluble amine and heating the resulting mixture, the said amine thus reacting with any excess of said benzyl halide to form a salt, said amine being non-emulsifying by itself and when reacted with benzyl halide, and separating said salt from said water immiscible benzyl ether.

8. A process for producing a benzyl ether of a polyoxyalkylene glycol monoether substantially free from hydroxyl groups which comprises reacting metallic sodium with a compound having the formula

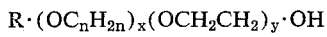

where R is a hydrocarbon group, containing 1 to 6 carbon atoms, $n$ is 2 to 3, $x$ is 2 to 4, $y$ is 0 when $n$ is 2 and at least 1 when $n$ is 3 with the further proviso that the values of R, $n$, $x$ and $y$ are such that when the resultant sodium alcoholate is reacted with a benzyl halide a water immiscible benzyl ether of a polyoxyalkylene glycol monoether is formed, reacting said sodium alcoholate with a benzyl halide to form said water immiscible benzyl ether of a polyoxyalkylene glycol monoether, thereafter adding to the resultant product a water soluble tertiary amine containing no active hydrogen atoms attached to an amino nitrogen atom and heating the resulting mixture to a temperature of 80°–100° C., the said amine thus reacting with any excess of said benzyl halide to form a quaternary salt, said amine being non-emulsifying by itself and when reacted with said benzyl halide, and separating said quaternary salt from said water immiscible benzyl ether.

References Cited

UNITED STATES PATENTS

| | | | |
|---|---|---|---|
| 2,791,567 | 5/1957 | Lowe et al. | 260—611 |
| 2,828,265 | 3/1958 | Van Strien. | |
| 3,137,737 | 6/1964 | Emrick et al. | 260—611 |
| 3,190,926 | 6/1965 | Edwards | 260—611 |
| 3,281,475 | 10/1966 | Boettner et al. | 260—611 |

BERNARD HELFIN, *Acting Primary Examiner.*